United States Patent [19]

Ritcey et al.

[11] 3,835,213

[45] Sept. 10, 1974

[54] CO-EXTRACTION AND SEPARATE RECOVERY OF URANIUM AND THORIUM FROM ACID SOLUTIONS

[75] Inventors: Gordon Malcolm Ritcey; Bernard Henry Lucas, both of Ottawa, Ontario, Canada

[73] Assignee: Canadian Patents and Development Limited, Ottawa, Ontario, Canada

[22] Filed: Oct. 1, 1971

[21] Appl. No.: 185,578

[52] U.S. Cl............... 423/9, 423/10, 423/252, 423/260, 23/312 ME, 252/301.1 R
[51] Int. Cl..................... B01d 11/00, C01g 56/00
[58] Field of Search ............ 23/340, 341, 345, 354, 23/312 ME; 423/9, 10, 252, 260; 252/301.1 R

[56] References Cited
UNITED STATES PATENTS

| | | | |
|---|---|---|---|
| 2,877,250 | 3/1959 | Brown et al. | 23/340 |
| 2,897,046 | 7/1959 | Bohlmann | 23/341 |
| 2,943,923 | 7/1960 | Morgan | 23/341 |
| 2,990,244 | 6/1961 | Brown et al. | 23/340 |
| 3,227,516 | 1/1966 | Cole et al. | 23/340 |
| 3,360,346 | 12/1967 | Huet et al. | 23/341 |

FOREIGN PATENTS OR APPLICATIONS

| | | | |
|---|---|---|---|
| 821,973 | 10/1959 | Great Britain | 23/340 |

*Primary Examiner*—Carl D. Quarforth
*Assistant Examiner*—R. L. Tate
*Attorney, Agent, or Firm*—Stevens, Davis, Miller & Mosher

[57] ABSTRACT

A process is described for separating uranium and thorium from an aqueous acid solution containing them together with rare earth elements. The process comprises contacting the solution with a water-immiscible organic solution of a high molecular weight primary or secondary amine whereby the uranium and thorium values are co-extracted and separating the resulting uranium and thorium loaded amine solution from the aqueous solution. The uranium and thorium are then easily separated from the loaded amine solution either by selective stripping or co-stripping and selective extraction.

4 Claims, 3 Drawing Figures

Figure 1:
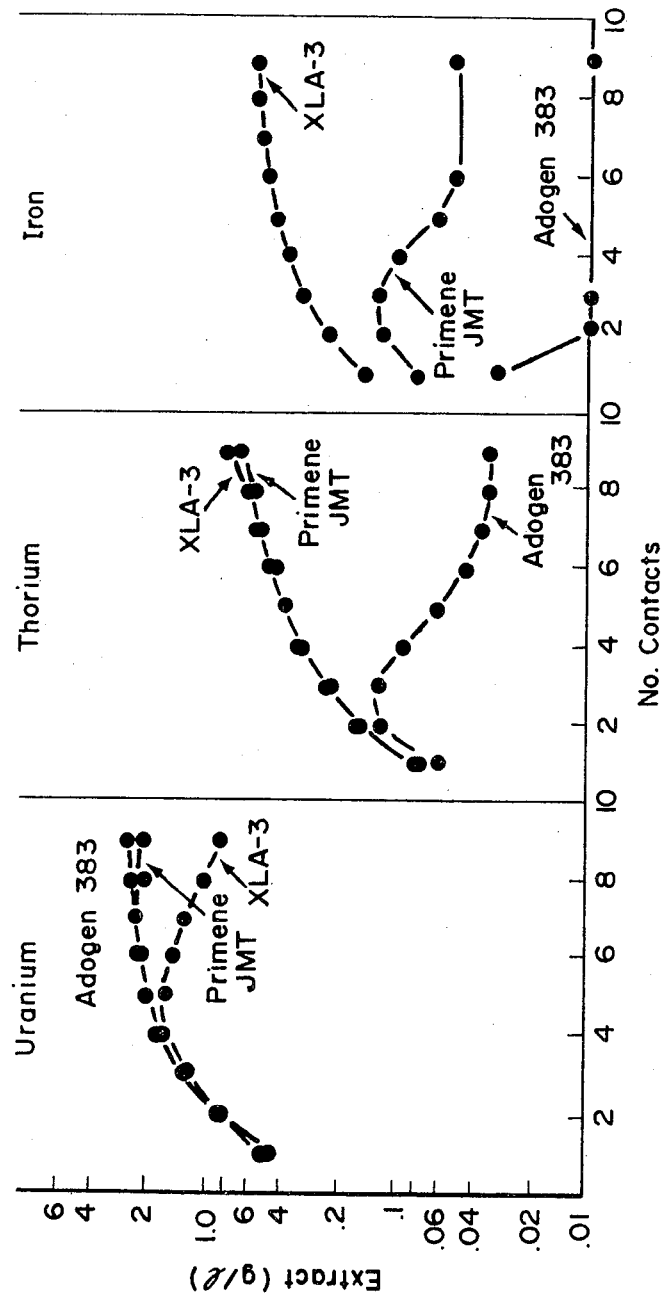

FIG. 1. Comparison of Amines for Co-extraction of Uranium and Thorium Effect of Stagewise Extraction on Exract Purity.

Single-stage scrubbing of loaded Primene Extract with $HNO_3$

Stripping of Thorium from Primene Extract (O.I.M.)

CO-EXTRACTION AND SEPARATE RECOVERY OF URANIUM AND THORIUM FROM ACID SOLUTIONS

This invention relates to a solvent extraction process for separating uranium and thorium from solutions containing them. More particularly, it relates to a process involving the co-extraction of uranium and thorium and the recovery of the two components by stripping.

Thorium and the rare earths are found associated with uranium in certain major uranium-producing areas, such as Elliot Lake, Ontario. Large volumes of barren liquor, relatively free from uranium but containing rare earth elements and thorium, are at present run to waste. This liquor results from sulfuric acid leaching of uranium ores, followed by removal of uranium from a filtered solution by ion exchange. An attempt has been made to recover a bulk rare earth concentrate from ion exchange barren solutions by solvent extraction but, to recover a salable rare earth product, thorium and residual uranium must be adsent, and at present these are removed by a two-stage precipitation technique.

The uranium is first removed by adsorption on an ion exchange resin. Thorium, remaining in the effluent, is then removed by a two-stage precipitation, at pH 3.8 to 4.1 using lime and aeration, followed by filtration and clarification of the treated solution prior to rare earth processing. The thorium-iron precipitate is not a salable product and is therefore discarded to waste.

The above system has the significant disadvantages of neutralization, precipitation and filtration steps being required for thorium removal and expensive filtration equipment being necessary. Also, the thorium value is lost to the mill as well as varying amounts of co-precipitated rare earths.

Various separation schemes are described in the literature for the recovery of uranium or of thorium separately by liquid-liquid extraction. Thus, the so-called "AMEX" process uses a primary amine for extraction of thorium followed by the extraction of uranium with a secondary or tertiary amine. Another prior process describes the use of a primary or secondary amine for the extraction of thorium and the author concluded that the primary amine was inferior to the secondary amine as regards stripping and iron selectivity during extraction. Yet another prior process describes the use of a secondary amine for thorium recovery.

It is the object of the present invention to provide an improved amine extraction system for removing uranium and thorium prior to rare earth recovery.

According to the present invention a process is provided for separating uranium and thorium from an aqueous acid solution containing them together with rare earth elements, which comprises contacting the solution with a water-immiscible organic solution of a high molecular weight primary or secondary amine whereby the uranium and thorium values are co-extracted into the amine solution. The resulting uranium and thorium loaded amine solution is separated from the aqueous solution and the uranium and thorium are then either (a) selectively stripped from the loaded amine solution or (b) co-stripped with an acid and then selectively extraction from the acid strip solution.

According to the selective stripping procedure, uranium is removed first by contacting the loaded amine solution with a dilute nitric acid solution having a concentration of not more than 1 percent. Thereafter the thorium is stripped from the amine solution by one of several methods and preferably by contacting the amine solution with a nitric acid solution having a concentration of 5 to 10 percent.

The products obtained by the nitric acid stripping are in the form of high purity salts and these are subjected to denitration. The denitration converts the uranium salt to a high purity uranyl trioxide while the thorium salt is converted to a high purity thorium sulfate. During denitration, nitric acid is regenerated and this can be recycled to the stripping stages.

In the co-stripping procedure, the loaded amine solution is contacted with a 10–25 percent nitric acid solution to co-strip the uranium and thorium. The resultant aqueous nitrate solution is then contacted with a 5–100percent solution of a neutral organo phosphate, e.g., tributyl phosphate (TBP), in an organic solvent to extract and separate the uranium from the thorium. The concentration of the nitric acid solution is preferably selected such that the aqueous nitrate solution obtained has a concentration of about 3 $MHNO_3$. This is preferred for the most effective extraction with TBP.

The uranium extracted in the TBP is subjected to denitration to yield pure thorium sulfate. The raffinate containing the thorium is treated in a separate denitration circuit to yield pure thorium sulfate. Nitric acid recovered from the denitration circuit can be recycled back to the process, while the sulfuric acid that concentrates during denitration, together with some nitric acid is recycled to the leaching circuit.

Thus, it will be seen that the extraction process of this invention provides a very simple technique for recovering individually both uranium and thorium from an acid leach solution without removal of other values, such as rare earths, so that these can easily be recovered from the leach solution in subsequent steps. Also, by using a closed circuit nitric acid stripping system, it is possible to obtain high purity uranium and thorium while at the same time significantly reducing pollution possibilities as compared to present practice. There are further economic advantages in that all the thorium is recovered as well as there being an increased recovery of rare earth elements.

Any of the high molecular weight primary or secondary amines can be used as extraction reagent in the present invention. The term "high molecular weight amine" refers to an amine having 10 or more carbon atoms. A particularly preferred amine is that available from Rohm and Haas under the trademark Primene JM-T.

As solvent for the amine, any water-immiscible organic solvent capable of dissolving the amine may be used. Typical solvents can include kerosene, hexane, ketones, alcohols, benzene, toluene, xylene, etc.

The concentration of the amine in the organic solution is not critical and may suitably range from 0.05 to 0.5 mole per liter.

During the extraction of uranium and thorium, there is the possibility of co-extraction of small amounts of iron which may be present in the feed solution. It has been found that these small amounts of iron can be effectively removed from the amine solution prior to the stripping of the uranium and thorium by scrubbing with a dilute nitric acid solution, e.g. a concentration of less than 1 percent. Care must, of course, be taken to maintain the scrubbing acid concentration and phase ratios such that only the iron is removed and substantial stripping of uranium does not occur.

According to one preferred procedure of the invention, thorium and uranium are co-extracted as uranium and thorium sulfates using a suitable amine reagent, such as Primene JM-T, from either a sulfuric acid leach solution or an ion exchange barren solution from which most of the uranium is removed.

The uranium and thorium loaded extract that is obtained is then stripped with 1 percent nitric acid solution to remove uranium as the nitrate and sulfate. The nitric acid strip solution is then concentrated to about 3 molar $HNO_3$, followed by extraction into tributyl phosphate (TBP) and this results in the separation of uranium from sulfate and possible small quantities of co-stripped iron and thorium. Water-stripping of the TBP followed by denitration of the uranyl trioxide ($UO_3$). The nitric acid recovered during the denitration is recycled to the TBP-acidification stage. The raffinate from the TBP extraction, containing about 3 molar $HNO_3$, is recycled to the Primene-stripping stage. Because sulfate, together with possible iron and thorium, are present, a bleed of this solution to a further treatment stage or to the leaching circuit is desirable to prevent buildup of these ions.

The thorium sulfate is finally recovered from the Primene extract by stripping with a 5 to 10 percent nitric acid solution, followed by a similar denitration treatment as was used for the uranyl nitrate solution. The resulting mill grade thorium sulfate product could contain some iron and uranium as impurities.

If both high purity uranium and thorium products are desired at the mill site, an alternative processing route can be used. Again the uranium and thorium are co-extracted wtih a primary or secondary amine, e.g., Primene JM-T and the resultant extract is scrubbed if necessary with dilute nitric acid to remove any traces of co-extracted iron. Following scrubbing, the uranium and thorium are co-stripped with 25 percent nitric acid solution. The resultant aqueous nitrate solution, at approximatey 3 molar $HNO_3$ free acid, is then contacted with 25 percent tributyl phosphate (in kerosene) to extract and separate the uranium from the thorium. The uranium is recovered from the loaded TBP solvent by water stripping followed by boiling down in a conventional denitration circuit to yield high purity uranyl trioxide. The raffinate containing the thorium is treated in a separate denitration circuit to yield pure thorium sulfate. The regenerated nitric acid from the denitration circuits is recycled back to the process, while the sulfuric acid that concentrates during denitration, together with some nitric acid is recycled to the leaching circuit.

Further preferred embodiments of the invention will now be illustrated by reference to the following examples:

EXAMPLE 1

A series of stage-wise extraction tests were conducted using selected amine extraction reagents. The reagents used were Primene JM-T (trademark of Rohm and Haas) Adogne 383 (trademark of Ashland Chemical) and XLA-3 (trademark of Rohm and Haas). These were made up as 0.1 molar solutions in a kerosene diluent containing 5 volume percent isodecanol.

An Elliot Lake acid leach solution was obtained containing 0.39 grams per liter uranium, 0.694 grams per liter thorium and 0.51 grams per liter iron. The leach solution had a pH of 1.6.

The amine extraction solution was contacted nine successive times with the leach solution at a phase ratio of aqueous to organic of 1/1 and a contact time of 5 minutes. The results of these extractions are illustrated in FIG. 1.

From the Figure it will be seen that XLA-3 gave good thorium loading but after four contacts the uranium began to scrub off while the iron continued to load on. The Adogen 383 had good uranium loading but after two contacts the thorium began to scrub off. The iton was also scrubbed from the Adogen 383 after two stages. Primene JM-T co-extracted uranium and thorium, resulting in a loading of 0.7 g/1 thorium and 2–3 g/1 uranium. The iron began scrubbing off after three contacts and was reduced to 0.05 g/1 after nine stages of contact.

It was also found from these tests that if the feed solution contains sufficient quantities of thorium or uranium and the required A/0 ratio is used in order to maintain saturation of the solvent with respect to the metals, then uranium or thorium will preferentially extract because of their higher extraction coefficient as compared with those of the rare earths.

EXAMPLE 2

A pilot plant scale extraction was conducted on a solution from sulfuric acid leaching of an Elliot Lake ore. This solution showed the following analysis in g/1: 0.65 U; 0.11 Th; 0.19 total rare earths; 2.5 total Fe; 1.3 $Fe^{+2}$.

The extraction reagent used was a 0.1 molar solution of Primene JM-T in a kerosene (shell 140) containing 5 percent isodecanol.

The extraction was carried out in a 2 inch diameter glass sieve-plate pulse column with the sieve-plates at 2 inch spacings. 12 feet of column was used and the extraction was carried out at room temperature at a feed pH of 1.6, with an A/0 ratio of 1.7/1. The pulse frequency was set at 36 cycles per minute with a 1.5 inch amplitude.

With this test a co-extraction of thorium and uranium of better than 98 percent was obtained while less than 1 percent iron was co-extracted.

EXAMPLE 3

The purpose of this test was to remove any co-extracted small amounts of iron in the uranium and thorium loaded extract. Tests were performed on the extract in which it was scrubbed with either nitric acid or sulfuric acid. The concentration of the scrubbing reagents was varied up to 20 percent, using 0/A ratios of 3 to 1. The feed extract (0.1 M Primene JM-T) containing 5 percent isodecanol analyzed 1.41 g/1 uranium, 0.62 g/1 thorium and 0.42 g/1 iron.

Figure 2:
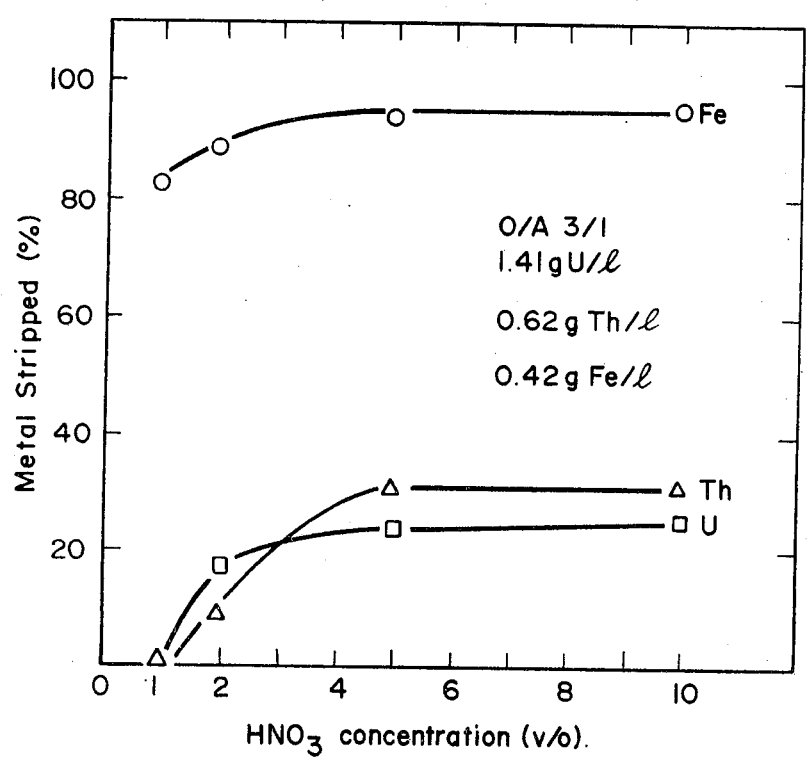

It was found that sulfuric acid removed relatively large amounts of thorium and uranium along with iron while 1 percent nitric acid was highly effective for maximum removal or iron with a minimum loss of uranium and thorium. The results of the tests with nitric acid scrubbing are shown in FIG. 2.

EXAMPLE 4 a. After removal of the iron by dilute nitric acid scrubbing according to Example 3, a series of stripping tests were carried out on 0.1 molar Primene JM-T extract containing 0.29 g/l uranium and 0.26 g/l thorium at various O/A ratios up to 20/1. Nitric acid, sulfuric acid and sodium carbonate were investigated at concentrations of 0.5 to 5 volume percent nitric, 20 to 30 volume percent nitric and up to 20 volume percent $Na_2CO_3$.

Of the above stripping reagents, the nitric acid was by far the most effective with a 1.0 volume percent nitric acid being highly effective both for uranium stripping and selective separation of the two metals. In a one stage operation at an O/A ratio of 5/1 and using 1 volume percent $HNO_3$, about 1 percent thorium was detected with the uranium. By contrast, the sulfuric acid system showed a relatively good uranium-thorium separation at an O/A of 3/1 but this required a 20 volume percent $H_2SO_4$ or greater. The sodium carbonate showed no selectivity of one metal over the other.

Figure 3:
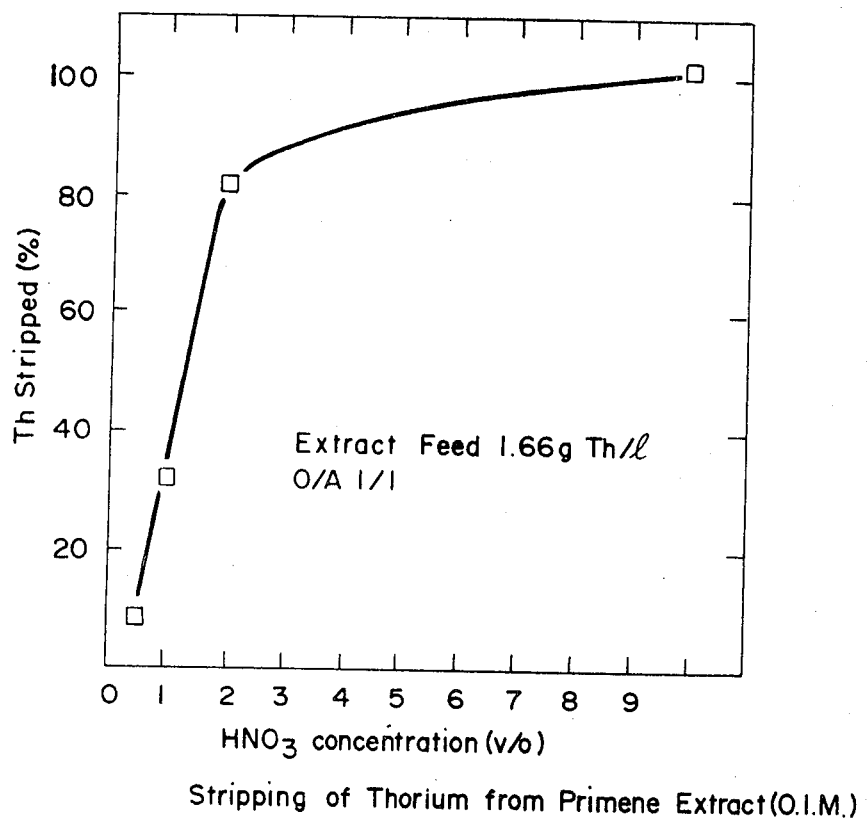

The results of the nitric acid stripping are illustrated in FIG. 3.

b. After the removal of the uranium by stripping with dilute nitric acid, the remaining thorium was effectively extracted by stripping with a 5 to 10 volume percent nitric acid solution.

We claim:

1. In a process for separating uranium and thorium from an aqueous acid solution containing them together with rare earth elements, which comprises contacting the solution with a water-immiscible organic solution containing from 0.05 0.5 mole per liter of a high molecular weight primary or secondary amine containing at least 10 carbon atoms, the improvement which comprises co-extracting the uranium and thorium values, separating the resulting uranium and thorium loaded amine solution from said aqueous solution and selectively stripping the uranium and thorium sequentially by first contacting the loaded amine solution with a dilute nitric acid solution having a concentration of not more than 1 percent to strip uranium and thereafter contacting the loaded amine solution with a nitric acid solution having a concentration of 5 to 10 percent to strip thorium.

2. A process according to claim 1 wherein the uranium is recovered as a salt which is then subjected to denitration to yield uranyl trioxide.

3. A process according to claim 1 wherein the thorium is recovered as a salt which is then subjected to denitration to yield thorium sulfate.

4. A process according to claim 1 wherein the aqueous acid solution containing uranium, thorium and rare earth elements, also contains iron which iron is removed from the solution by scrubbing with a dilute nitric acid solution prior to stripping the uranium and thorium.

* * * * *